US012803346B2

(12) United States Patent
Kocher et al.

(10) Patent No.: US 12,803,346 B2
(45) Date of Patent: Nov. 17, 2026

(54) ELECTRIC MACHINE HAVING A STATOR SLEEVE AND METHOD OF FORMING THE SAME

(71) Applicant: GE AVIATION SYSTEMS LLC, Grand Rapids, MI (US)

(72) Inventors: Sooraj Govindankutty Kocher, Bengaluru (IN); Balamurugan Sridharan, Bengaluru (IN); Ami Hatim, Bengaluru (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 217 days.

(21) Appl. No.: 18/537,152

(22) Filed: Dec. 12, 2023

(65) Prior Publication Data

US 2025/0038589 A1 Jan. 30, 2025

(30) Foreign Application Priority Data

Jul. 27, 2023 (IN) ............................ 202311050681

(51) Int. Cl.

| | |
|---|---|
| ***H02K 1/18*** | (2006.01) |
| ***H02K 7/18*** | (2006.01) |
| ***H02K 15/02*** | (2025.01) |
| ***H02K 15/028*** | (2025.01) |
| *F02C 6/00* | (2006.01) |
| *F02C 7/268* | (2006.01) |

(52) U.S. Cl.

CPC ........... *H02K 1/185* (2013.01); *H02K 7/1823* (2013.01); *H02K 15/028* (2013.01); *F02C 6/00* (2013.01); *F02C 7/268* (2013.01); *F05D 2260/85* (2013.01)

(58) Field of Classification Search

CPC ........ F02C 6/00; F02C 7/268; F05D 2260/85; H02K 1/185; H02K 15/028; H02K 2213/03; H02K 5/02; H02K 7/1823; H02K 9/223

USPC .................................................. 310/216.113

See application file for complete search history.

(56) References Cited

U.S. PATENT DOCUMENTS

| | | | | |
|---|---|---|---|---|
| 2,887,062 | A * | 5/1959 | Cametti .............. | F04D 29/5806 417/423.14 |
| 6,196,526 | B1 | 3/2001 | Lee et al. | |
| 6,617,715 | B1 | 9/2003 | Harris et al. | |
| 6,617,716 | B2 | 9/2003 | Ishida | |
| 6,639,334 | B2 | 10/2003 | Chen et al. | |
| 6,727,609 | B2 | 4/2004 | Johnsen | |
| 6,933,633 | B2 | 8/2005 | Kaneko et al. | |
| 8,395,287 | B2 | 3/2013 | Bradfield | |
| 8,395,288 | B2 * | 3/2013 | Huynh ..................... | H02K 9/06 310/59 |

(Continued)

FOREIGN PATENT DOCUMENTS

| | | | |
|---|---|---|---|
| CN | 101882818 | A | 11/2010 |
| DE | 102012011206 | A1 | 12/2012 |

(Continued)

OTHER PUBLICATIONS

Translation of foreign document DE 102012011206 A1 (Year: 2012).*

*Primary Examiner* — Alex W Mok

(74) *Attorney, Agent, or Firm* — Thomas | Horstemeyer, LLP

(57) ABSTRACT

An electric machine having a stator circumscribed by a stator sleeve coupled to an interior surface of a housing. A thermal barrier is disposed between an outer surface at the axial center of the stator sleeve and the housing.

20 Claims, 8 Drawing Sheets

(56) References Cited

U.S. PATENT DOCUMENTS

| | | | | |
|---|---|---|---|---|
| 8,482,168 | B2 * | 7/2013 | Garriga | F16C 33/6659 310/59 |
| 9,054,565 | B2 * | 6/2015 | Fulton | H02K 9/19 |
| 9,525,325 | B2 * | 12/2016 | Chamberlin | H02K 5/203 |
| 9,621,011 | B2 * | 4/2017 | Wirsch, Jr. | H02K 5/203 |
| 10,381,900 | B2 | 8/2019 | Huang et al. | |
| 10,461,595 | B2 | 10/2019 | Teter et al. | |
| 10,476,358 | B2 | 11/2019 | Huang et al. | |
| 10,577,975 | B2 | 3/2020 | Ertas et al. | |
| 10,598,084 | B2 * | 3/2020 | Hoke | F01D 25/12 |
| 10,621,541 | B2 * | 4/2020 | Andres | G06Q 10/08 |
| 10,811,926 | B2 * | 10/2020 | Rittmeyer | H02K 5/04 |
| 10,826,345 | B2 * | 11/2020 | Huang | H02K 3/22 |
| 11,489,386 | B2 | 11/2022 | Huang et al. | |
| 11,542,029 | B2 | 1/2023 | Huang et al. | |
| 2014/0056721 | A1 * | 2/2014 | Garrard | F04D 29/5806 29/598 |
| 2014/0241865 | A1 * | 8/2014 | Arimatsu | H02K 5/203 29/889 |
| 2019/0165636 | A1 * | 5/2019 | Rittmeyer | H02K 5/02 |

FOREIGN PATENT DOCUMENTS

| | | | | |
|---|---|---|---|---|
| GB | 2293695 | A | 4/1996 | |
| JP | 2018207561 | A * | 12/2018 | H02K 5/18 |

* cited by examiner

ELECTRIC MACHINE HAVING A STATOR SLEEVE AND METHOD OF FORMING THE SAME

CROSS REFERENCE TO RELATED APPLICATION

This application claims priority to Indian Provisional Application No. 202311050681, filed Jul. 27, 2023, the disclosure of which is hereby incorporated by reference in its entirety as though fully set forth herein.

BACKGROUND

Contemporary aircraft engines include electric machine assemblies, or generator systems, which utilize a running aircraft engine in a generator mode to provide electrical energy to power systems and components on the aircraft. Some aircraft engines can further include starter/generator (S/G) systems or motor/generator (M/G), which act as a motor to start an aircraft engine from its high-pressure spool or a motor to drive the engine from its low-pressure spool, and as a generator to provide electrical energy to power systems on the aircraft after the engine is running. Motors and generators can be wet cavity systems, wherein a cavity housing the rotor and stator is exposed to fluid coolant, or dry cavity systems, wherein the cavity is not exposed to fluid coolant.

DESCRIPTION OF EMBODIMENTS

Figure 1:
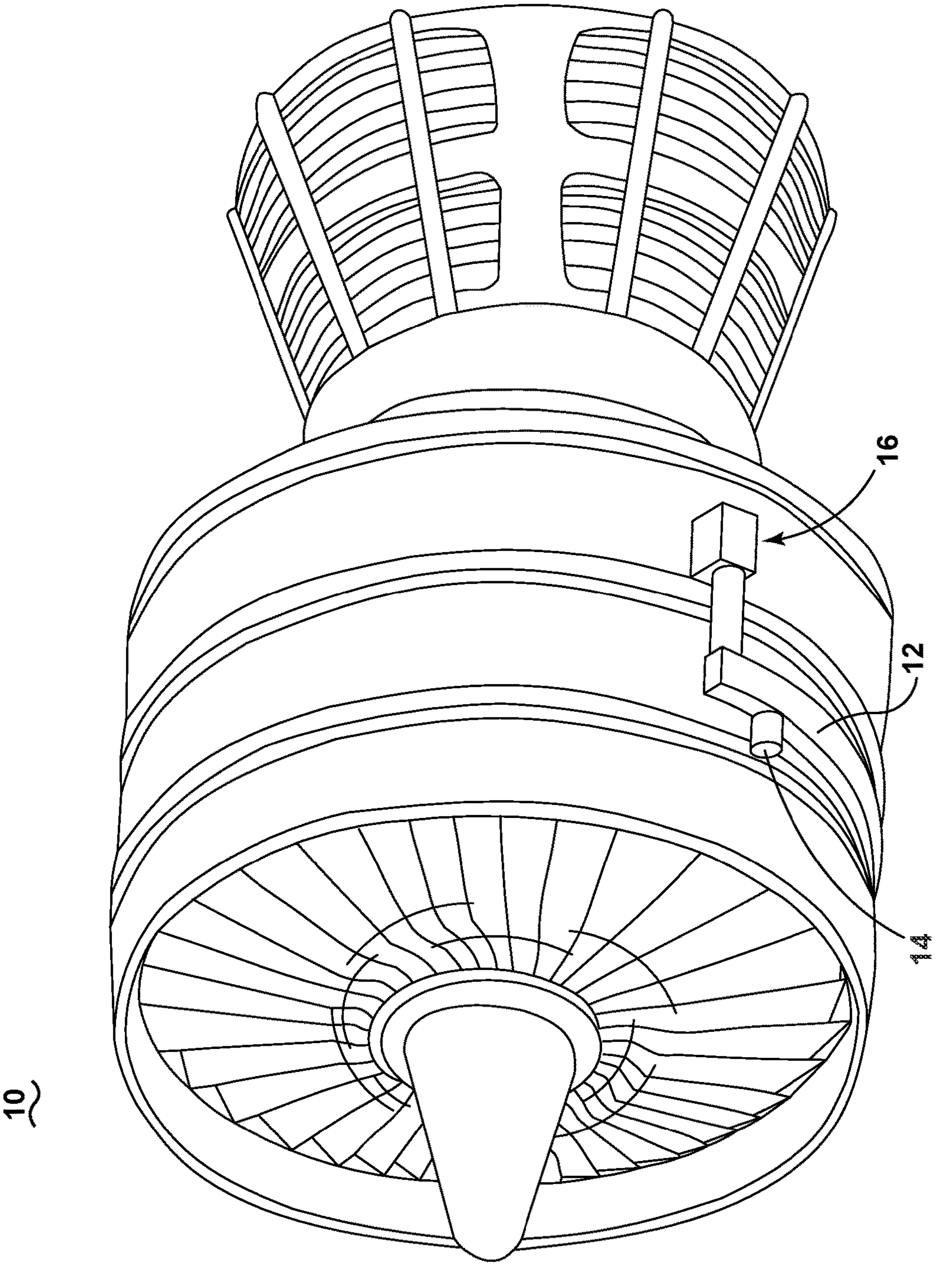
FIG. 1 is a perspective view of a gas turbine engine having a generator in accordance with various aspects described herein.

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator and rotor combinations can be included in the machine. While this description is primarily directed toward an electric machine providing power generation (e.g., a generator), it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

As used herein, the terms such as "first", "second", and "third" may be used interchangeably to distinguish one component from another and are not intended to signify location or importance of the individual components.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free fluid coolant (e.g., coolant freely moving within the cavity). In contrast, a "dry" cavity generator the rotor and stator can be cooled by coolant contained within limited in fluidly sealed passages (e.g., non-freely moving about the cavity).

As used herein, the term "underlie" denotes a relative position radially closer to a rotational axis of a rotatable shaft. Also as used herein, the term "overlie" denotes a relative position radially farther from the rotational axis of the rotatable shaft.

As used herein, the term "electrically insulative" refers to a material that exhibits a low electrical conductivity (for example, less than about 10–8 siemens per meter (S/m)).

As used herein, the term "thermally insulative" refers to a property of a material that exhibits a low thermal conductivity (for example, less than about 200 watts per meter-Kelvin (W/(mK)).

As used herein, the term "thermal conductivity" refers to the relative ability of a material to conduct or transfer heat.

As used herein, the term "thermal barrier" refers to a thermally insulative material or element that operates at elevated temperatures or in an environment with elevated temperatures. That is, a thermal barrier is a material, or an element formed with the material, having a relatively low thermal conductivity (e.g., below 100 W/mK) arranged to resist or retard a flow of heat therethrough.

Aspects of the disclosure described herein are directed to an electric machine having a rotor assembly arranged to rotate with respect to a stator assembly. For the purposes of illustration, exemplary aspects will be described herein in the form of an electric machine, specifically a generator, for a gas turbine engine and having a rotor assembly. It will be appreciated however, that the electric machine can be in the form of a generator, a motor, a permanent magnet generator (PMG), or a starter/generator (S/G), and the like, in non-limiting examples. It will be further understood, however, that aspects of the disclosure described herein are not so limited and can have general applicability within other electric machines or systems. For example, the disclosure can have applicability for systems in other engines or vehicles, and may be used to provide benefits in industrial, commercial, and residential applications.

For example, electric machines, such as conventional wound-rotor generators, are a major source of electrical energy for industrial and commercial applications. They are commonly used to convert mechanical power output of steam turbines, gas turbines, reciprocating engines and hydro-turbines into electrical power. Typically, these electric machines include a central rotatable assembly or "rotor" that is circumscribed by a stationary assembly or "stator". A small air gap separates the rotor and stator. The rotor can include a rotatable element defining a central rotational axis and defining a periphery. The rotor typically includes a rotatable shaft and a rotor core having one or more sets of conductive rotor windings. The rotor windings can be wound about the periphery. The rotor windings are typically axially wound around a set of posts or rotor teeth defining slots therebetween. The number of sets of rotor windings typically define the number of electrical phases of the electric machine. A portion of the windings (e.g., an end turn portion) of conventional rotors typically extend past or overhang the rotor. The rotor winding end turns in some electric machines are supported and/or covered by a housing, cover, or other structure.

In operation, the rotor of conventional electric machines is driven to rotate by a source of rotation, such as a mechanical or electric machine, which for some aircraft may be a gas turbine engine. The rotor is often rotated at relatively high revolutions per minute (rpm) (e.g., 20,000-500,000 rpm). In many cases, the rotor can spin relative to the stator in response to an electrical current. The electrical current passing through the rotor and stator creates heat. For example, heat is generated in the rotor due to the flow of current through the windings, and changing magnetic fields present in the rotor, causing the temperature to rise in the rotor. Heat can also be caused by, for example, stator core losses due to hysteresis or eddy currents generated during operation. It is desirable to cool the rotor and stator to protect the electric machine from damage and to increase the electric machine power density to allow for more power from a smaller physically sized electric motor.

Furthermore, due to the relatively linear relation between rotational speed and shaft power of an electric machine, increasing the rated speed of a generator can boost the power density and efficiency of the generator. Accordingly, there is a growing demand for conventional electric machines to operate at increasingly higher speeds. However, operation of conventional electric machines at higher speeds can create more heat that is reduced or removed.

In some cases, the heat is removed by passing air currents across and through the motor. In other cases, oil or other fluid coolant is passed through the electric motor in proximity to the stator. The fluid coolant typically flows through passages formed in the motor housing adjacent the stator. In still other cases, coolant is passed through passages formed in the stator. In some cases, the fluid coolant or oil is sprayed on the end turn portion of the rotor windings and stator windings that extend past or overhang the rotor or stator, respectively (i.e., at axial ends of the motor).

Some conventional electric machines can also include an external cooling jacket to surround the stator and thermally conduct heat away from the stator. For example, the cooling jacket is typically a cylindrical sleeve that is in contact with the entire axial length of the circumferential periphery of the stator to maximize heat flow from the stator to the cooling jacket. Conventional external cooling jackets also typically include coolant passages defined therein encircling at least a portion of the stator. The coolant passages have a thermally conductive fluid coolant disposed therein, fluidly coupled with a fluid coolant source. The fluid coolant traverses the cooling jacket via the coolant passages and provides cooling by thermal conduction from the stator to the jacket along the full axial length of the stator to ensure desired generator operation.

However, such conventional cooling systems increase the costs, complexity, and adds to the weight and size requirements of the generator system. Another problem with conventional electric machines is that conventional cooling systems can have difficultly removing heat generated by at least one of the stator or the set of stator windings. For example, with conventional cooling techniques, heat is often retained proximate to the axial center of the stator. This commonly results in a central "hot spot", with relatively higher temperatures measured at the axial center of a periphery of the stator, than at the axial ends of the stator, which can result in reduced generator performance or output. Such central hot spots can be challenging to cool, while the axial ends of the stator are relatively easier to cool via thermal convection or conduction.

As described herein, aspects of the disclosure are provided to beneficially remove heat from the stator, and to reduce or eliminate hot spots or relatively higher localized temperatures at the axial center of the stator. Aspects of the disclosure can be implemented without need of fluid cooling, or can be implemented in conjunction with fluid cooling systems, in both dry cavity and wet cavity type electric machines. As further described herein, aspects are arranged to provide a relatively greater thermal flow from the stator to the axial ends of a stator sleeve and housing walls surrounding the stator for improved cooling over conventional techniques.

The exemplary drawings are for purposes of illustration only and the dimensions, positions, order, and relative sizes reflected in the drawings attached hereto can vary. Additionally, in some drawings, parts may be omitted for clarity.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or the gas turbine engine 10 could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, by way of non-limiting example, aspects of the disclosure are not so limited, and aspects can include any electromotive or electric machine, such as, without limitation, a motor, or generator, an exciter, and the like.

Figure 2:
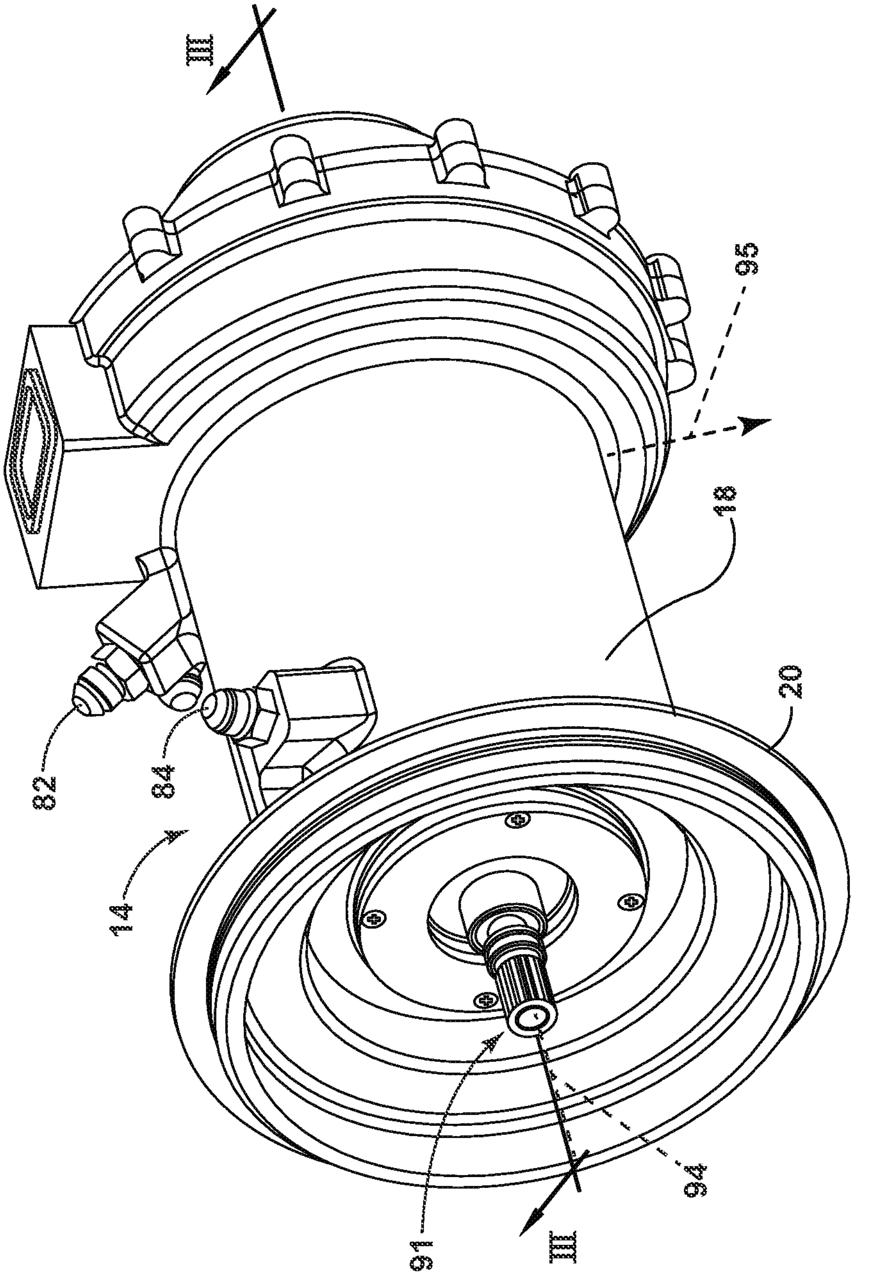
FIG. 2 is a perspective view of an exterior of the generator of FIG. 1, in accordance with various aspects described herein.

FIG. 2 more clearly illustrates a non-limiting example of generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a fluid coolant system for cooling or dissipating heat generated by components of the generator 14 or by components proximate to the generator 14, one non-limiting example of which can be the gas turbine engine 10. For example, the generator 14 can include a fluid cooling system using oil as a coolant.

The fluid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The fluid cooling system can also include a second coolant outlet port 91, shown at a rotatable shaft portion of the generator 14. Optionally, by way of non-limiting example, the fluid cooling system can include a rotatable shaft coolant inlet port 94 or a generator coolant outlet port 95. While not shown, aspects of the disclosure can further include other fluid cooling system components, such as a fluid coolant reservoir fluidly coupled with the cooling fluid inlet port 82, the rotatable shaft coolant inlet port 94, the cooling fluid outlet port 84, or the generator coolant outlet port 95, and a fluid coolant pump (not shown) to forcibly supply the coolant through the ports 82, 84, 94, 95 or generator 14.

Figure 3:
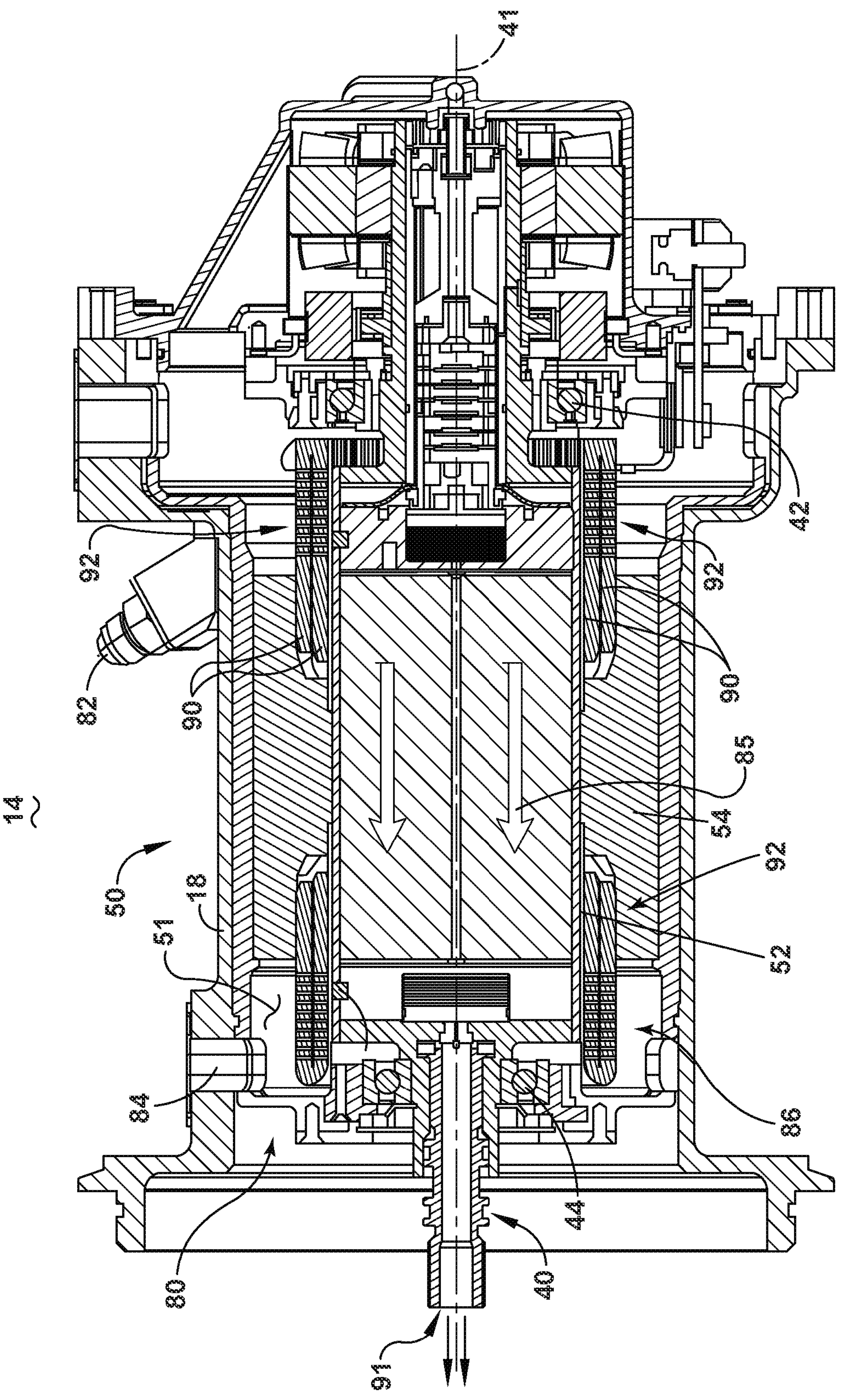
FIG. 3 is a schematic cross-sectional view of the generator, taken along line III-III of FIG. 2 and illustrating the structure of the generator, in accordance with various aspects described herein.

A non-limiting interior of the generator 14 is best seen in FIG. 3, which is a cross-sectional view of the generator 14 shown in FIG. 2 taken along line III-III. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51. The rotating component can comprise a rotor 52, and the corresponding fixed component comprises a stator 54 or stator core. In this manner, the rotor 52 is disposed on and co-rotates with the rotatable shaft 40. The fixed components can be mounted to any suitable part of the housing 18. Collectively, the fixed components define an interior through which the rotatable shaft 40 extends and rotates relative thereto.

It will be understood that the rotor 52 can have a set of rotor poles, and that the stator 54 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding or coil, with the winding having at least one end turn. Aspects of the disclosure shown include the stator 54 having at least one set of stator windings 90 arranged longitudinally along the stator 54, that is, in parallel with the rotational axis 41. The set of stator windings 90 can also include a set of stator winding end turns 92 extending axially beyond opposing ends of a longitudinal length of the stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the fluid coolant pump, a fluid compressor, or a hydraulic pump.

As explained above, the generator 14 can use a cooling fluid, such as oil, and thus can include a cooling system 80. The cooling oil or fluid can be used to dissipate heat generated by the electrical and mechanical functions of the generator 14. The cooling system 80 using a cooling fluid can also provide for lubrication of the generator 14. In the illustrated aspects, the generator 14 can be an oil-cooled, wet cavity type cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the rotor 52, as well as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
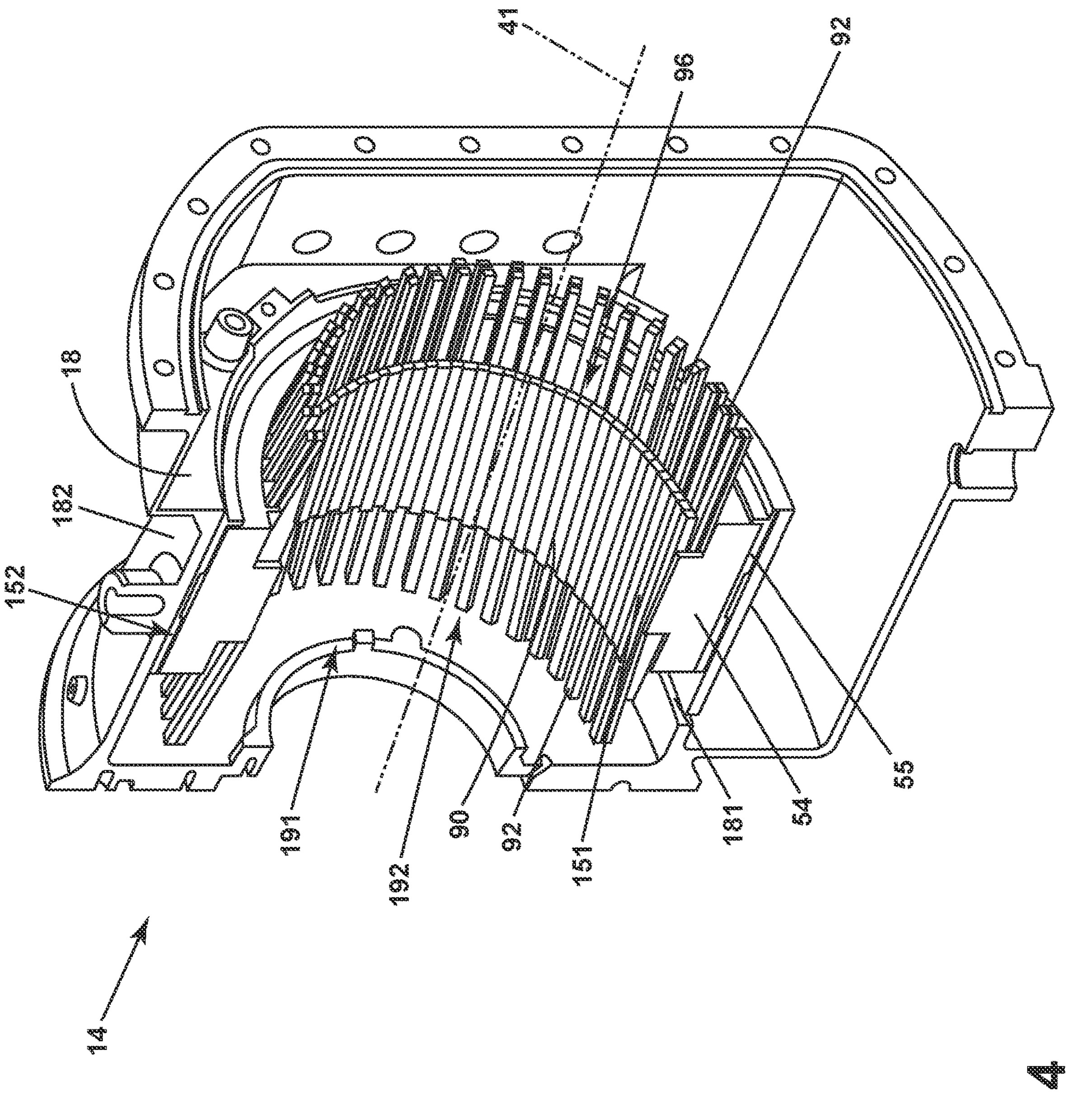
FIG. 4 is a schematic zoomed view of the generator of FIG. 3, in accordance with various aspects described herein.

FIG. 4 illustrates a perspective view of a portion of the housing 18 and stator 54 of the generator 14 of FIG. 3 in partial cross-section, with some parts (e.g., the rotor 52, rotatable shaft 40, etc.) omitted for clarity. As shown, the generator 14 includes the housing 18, the stator 54, including the set of stator windings 90, and a stator sleeve 55. The stator 54 circumferentially surrounds the rotational axis 41.

The housing 18 includes a housing interior surface 181, and an opposing housing exterior surface 182 spaced from the housing interior surface 181. The housing interior surface 181 is arranged to define a first bore 191. The housing interior surface 181 circumferentially surrounds or encloses the stator 54. For example, the stator 54 can be disposed in the first bore 191.

The stator 54 can define a radially inner perimetric stator surface 151 and an opposing radially outer perimetric stator surface 152 that is radially outwardly spaced from the radially inner perimetric stator surface 151. The radially inner perimetric stator surface 151 defines a second bore 192. The stator 54 can include the stator windings 90 arranged longitudinally or axially along the radially inner perimetric stator surface 151 (i.e., in parallel with the rotational axis 41). The stator windings 90 can be disposed in slots 96 defined on radially inner perimetric stator surface 151. The stator winding end turns 92 extend axially beyond opposing ends of the longitudinal length of the stator 54. The rotor 52 and rotatable shaft 40 (both shown in FIG. 3) can be disposed in the second bore 192, and are rotatable relative to the stator 54 and define the rotational axis 41.

While a substantially rectangular stator winding 90 cross section is illustrated, any geometric cross section can be included in aspects of the disclosure, including by not limited to circular, ovate, square, and the like. Non-limiting aspects of the disclosure can also be included wherein the set of stator windings 90 includes a layer of electrically insulating material (not shown) external to, and enveloping the set of stator windings 90, to electrically isolate the set of stator windings 90 from another set of stator windings 90 and the stator 54 or stator sleeve 55.

The stator sleeve 55 circumferentially surrounds the stator 54. The stator sleeve 55 is disposed between the stator 54 and the housing 18. More specifically, the stator sleeve is disposed between the radially outer perimetric stator surface 152 and the housing interior surface 181.

Figure 5:
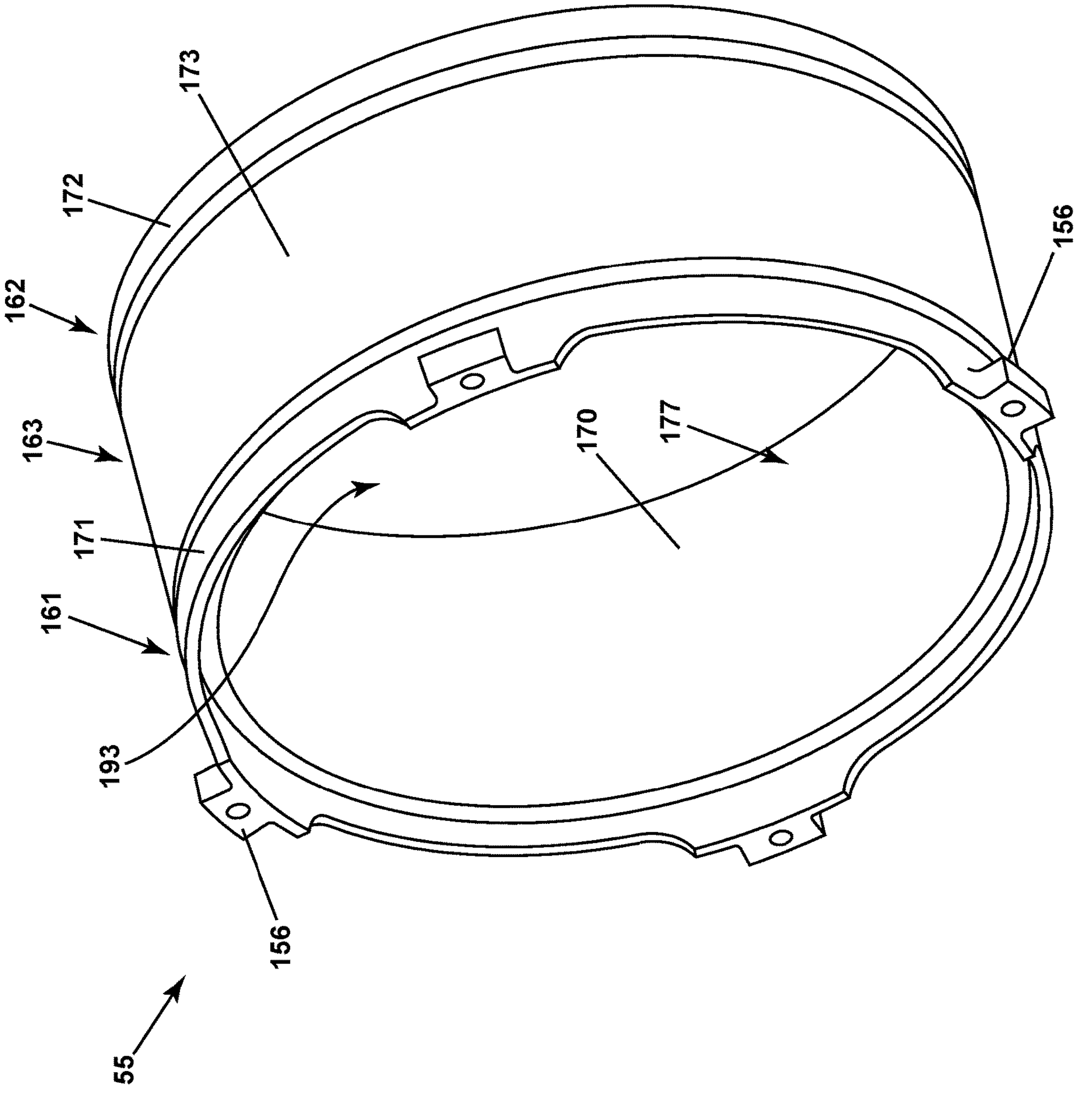
FIG. 5 is a perspective view of an exemplary stator sleeve in accordance with various aspects described herein.

FIG. 5 illustrates a perspective view of the stator sleeve 55 of FIG. 4. The stator sleeve 55 is generally annular, having a radially inner perimetric stator sleeve surface 170 defining a third bore 193. The stator sleeve 55 can include a first diametric end portion 161 having a radially outer first perimetric stator sleeve surface 171, an opposing second diametric end portion 162 axially spaced from the first diametric end portion 161, having a radially outer second perimetric stator sleeve surface 172. An annular intermediate wall portion 163 extends axially between, and is coupled to, the first and second diametric end portions 161, 162. In non-limiting aspects, the intermediate wall portion 163 can extend along 66% of the axial length of the stator sleeve. In other non-limiting aspects, the intermediate wall portion 163 can extend along between 50-75% of the axial length of the stator sleeve. In other non-limiting aspects, the intermediate wall portion 163 can extend along between 30-90% of the axial length of the stator sleeve 55. Other aspects are not so limited, and the intermediate wall portion 163 can extend along any desired percentage of the axial length of the stator sleeve 55 without departing from the scope of the disclosure. The intermediate wall portion 163 includes a third radially outer perimetric stator sleeve surface 173. The first, second, and third perimetric stator sleeve surfaces 171, 172, 173 are radially outwardly spaced from and oppose the radially inner perimetric stator sleeve surface 170. In non-limiting aspects, mounting tabs 156 can be formed on the stator sleeve 55 to enable attachment of the stator sleeve 55 to the housing 18, for example using screws, rivets, or other fasteners (not shown).

The stator sleeve 55 can be formed of a first material 177. The first material 177 can include a metal. By way of non-limiting example, the metal included in the first material 177 can be steel (i.e., steel alloys), magnesium (i.e., magnesium alloys), aluminum (i.e., aluminum alloys), zinc (i.e., zinc alloys), or any combination thereof. While described as including a metal, it is contemplated that the first material 177 can be made of non-metal materials. By way of non-limiting example, the first material 177 can include carbon. The first material 177 is thermally conductive and have a first thermal conductivity (designated "TC1"). For example, the first thermal conductivity TC1 can be greater than 200 w/mK. It is further contemplated that the first material 177 can be electrically conductive. That is, the first material 177 can have a volume resistivity less than 1×104 ohms-centimeter.

Figure 6:
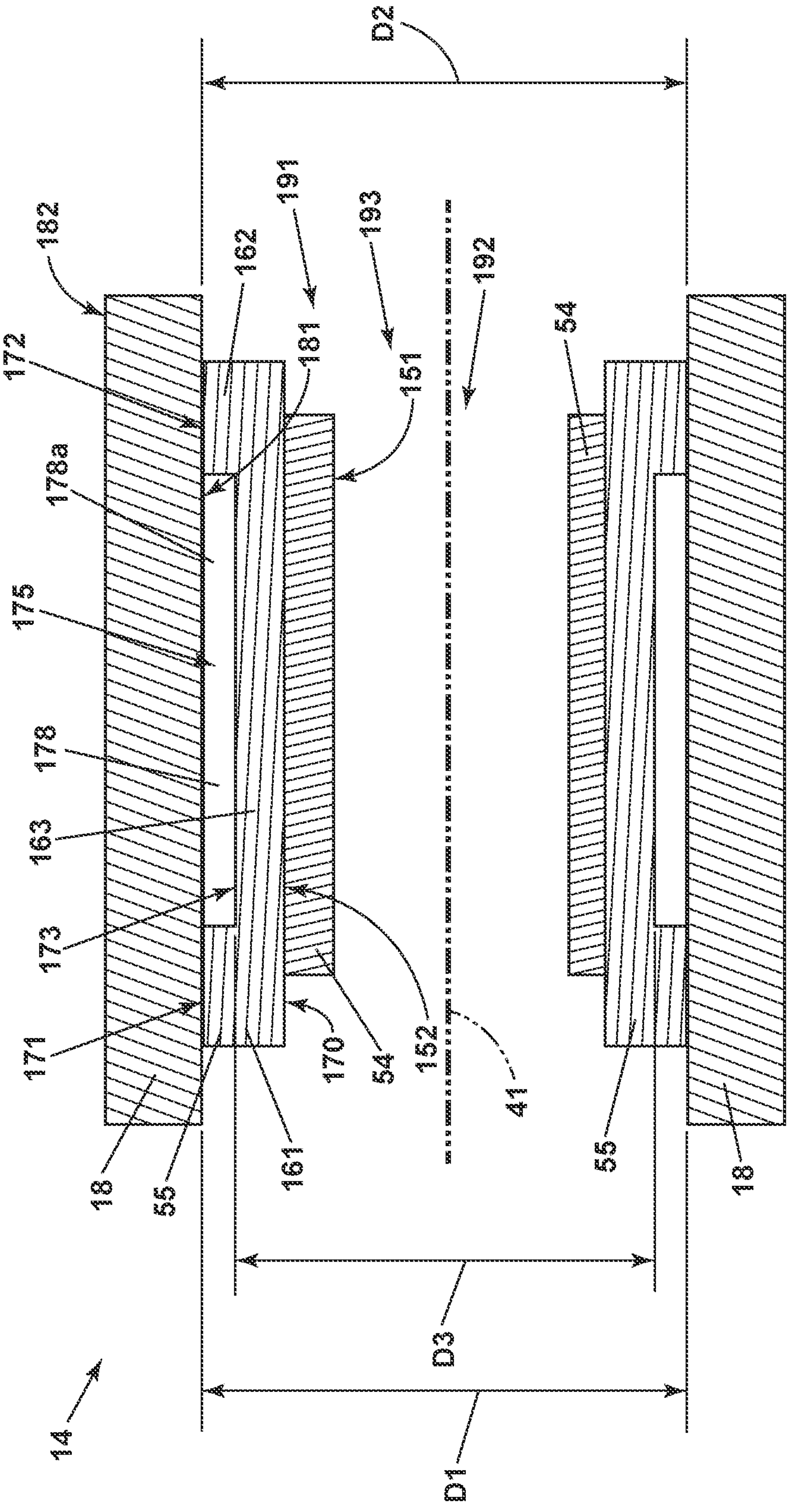
FIG. 6 is a schematic diagram depicting a portion of the stator and housing of the generator of FIG. 4, in accordance with various aspects described herein.

FIG. 6 is a schematic diagram depicting a portion of the stator and housing the generator 14 of FIG. 4 in cross-section, with some parts (e.g., stator windings 90, rotor 52, rotatable shaft 40, etc.) omitted for clarity. As shown, the stator sleeve 55 is disposed in the first bore 191 defined by the housing interior surface 181, and the stator 54 is disposed in the third bore 193 defined by the stator sleeve 55. The rotor 52 and rotatable shaft 40 (both shown in FIG. 3) can be disposed in the second bore 192, and define the rotational axis 41. The third radially outer perimetric stator sleeve surface 173 and the housing interior surface 181 cooperatively define a cavity 175 therebetween. In non-limiting aspects, a second material 178 can be disposed in the cavity 175. As illustrated, the proportions of some parts have been exaggerated for clarity. For example, the radial thickness of the stator sleeve 55 and cavity 175 are exaggerated for visual clarity. It is contemplated that in practice, the thickness of the stator sleeve or cavity 175, or both, can be proportionally much smaller without departing from the scope of the disclosure.

The cavity 175 can circumscribe the stator sleeve 55. In non-limiting aspects, the cavity 175 extends axially between the first diametric end portion 161 to the second diametric end portion 162 of the stator sleeve 55, and extends radially from the third radially outer perimetric stator sleeve surface 173 to the housing interior surface 181.

The first radially outer perimetric stator sleeve surface 171 can define a first outside diameter D1 and the second radially outer perimetric stator sleeve surface 172 can define a second outside diameter D2. In non-limiting aspects, the first and second outside diameters D1, D2 can be the same dimension. The third radially outer perimetric stator sleeve surface 173 defines a third outside diameter D3. The third outside diameter D3 can be less than the first and second diameters D1, D2. As will be appreciated, the smaller third diameter D3 relative the first and second diameters D1, D2 can locate the cavity 175 between the third radially outer perimetric stator sleeve surface 173 and the housing interior surface 181, and enhances the flexibility of the stator sleeve 55 to absorb mechanical stresses during operation.

As illustrated, in non-limiting aspects, the first radially outer perimetric stator sleeve surface 171 and second radially outer perimetric stator sleeve surface 172 confront the housing interior surface 181 and are coupled thereto. For example, the first radially outer perimetric stator sleeve surface 171 and second radially outer perimetric stator sleeve surface 172 can be fixed to the housing interior surface 181 using one or more bolts, screws, pins, keys, or other known fasteners (not shown). In other non-limiting aspects, the first radially outer perimetric stator sleeve surface 171 and second radially outer perimetric stator sleeve surface 172 can be coupled to the housing interior surface 181 via an interference fit, friction fit, or press-fit engagement between the first radially outer perimetric stator sleeve surface 171 and second radially outer perimetric stator sleeve surface 172 and the housing interior surface 181. Other aspects are not so limited, and it is contemplated that the first radially outer perimetric stator sleeve surface 171 and the second radially outer perimetric stator sleeve surface 172 can be rotatably coupled to the housing interior surface 181 by any desired affixing mechanisms.

As further illustrated, the inner perimetric stator sleeve surface 170 is coupled to the radially outer perimetric stator surface 152. The inner perimetric stator sleeve surface 170 can be fixed to the radially outer perimetric stator surface 152 using one or more bolts, screws, pins, keys, or other known fasteners (not shown). In other non-limiting aspects, the inner perimetric stator sleeve surface 170 can be coupled to the radially outer perimetric stator surface 152 via an interference fit, friction fit, or press-fit engagement between the inner perimetric stator sleeve surface 170 and the radially outer perimetric stator surface 152. Other aspects are not so limited, and it is contemplated that the inner perimetric stator sleeve surface 170 can be rotatably coupled to the radially outer perimetric stator surface 152 by any desired affixing mechanisms.

The second material 178 has a second thermal conductivity (designated "TC2"). The second thermal conductivity TC2 is less that the first thermal conductivity TC1. For example, the second thermal conductivity TC2 can be less than 200 w/mK. In one non-limiting aspect, the second material 178 can include air. In still other non-limiting aspects, the second material 178 can comprise an annular structure 178*a* formed of an organic (e.g., a resin) or inorganic (e.g., aluminum oxide) material, or combinations thereof. For example, the second material 178 can comprise a mixture of aluminum oxide and titanium carbide composites. In other aspects, the second material 178 can comprise a mixture of aluminum oxide and zirconium dioxide. In some aspects, the second material 178 can be a ceramic material. For example, the second material 172 can include, without limitation, aluminum oxide ($Al_2O_3$), silicon carbide (SiC), silicon dioxide ($SiO_2$), magnesium oxide (MgO), zirconium dioxide ($ZrO_2$), yttria stabilized zirconia (YSZ), Silicon Nitride ($Si_3N_4$), aluminum nitride (AlN), boron carbide ($B_4C$), and boron nitride (BN), individually, or in various combinations thereof. Additionally, the second material 178 can comprise any of glass and glass ceramics, such as Borosilicate glass, quartz, alumino-silicates, silicate ceramics, or magnesium silicates individually, or in various combinations thereof. In still other non-limiting aspects, the second material 178 can include non-binary ceramics such as aluminum titanate ($Al_2TiO_5$), barium titanate ($BaTiO_3$), or zirconium titanate ($ZrTiO^4$) individually, or in various combinations thereof. In yet other non-limiting aspects, the second material 178 can include conductive ceramics such as carbides, borides, nitrides, silicides of d-block elements, including for example, titanium oxides ($TiO_x$, where x<1), titanium carbides ($TiC_x$), titanium nitrides ($TiN_x$), titanium boride ($TiB_2$), zirconium diboride ($ZrB_2$), hafnium diboride ($HfB_2$), tungsten carbide (WC), molybdenum disilicide ($MoSi_2$).

In non-limiting aspects, as illustrated, the second material 178 can be disposed in the cavity 175 to substantially fill the cavity 175. In other aspects, the second material 178 can only partially fill the cavity 175.

Figure 7:
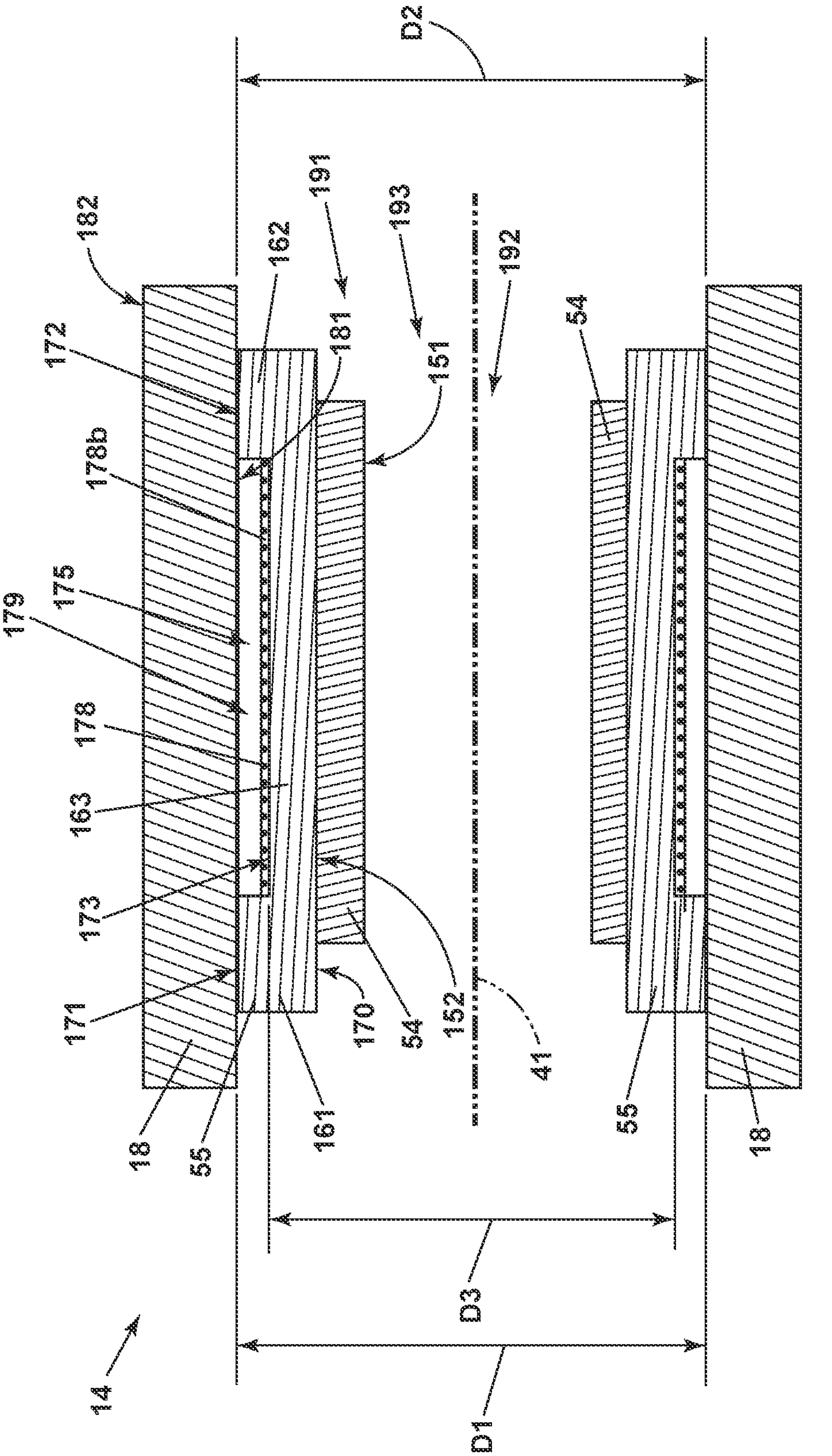
FIG. 7 is a schematic diagram depicting a portion of another exemplary stator and housing of a generator, in accordance with various aspects described herein.

FIG. 7 is a schematic diagram depicting a portion of another non-limiting aspect of the generator 14, with some parts (e.g., stator windings 90, rotor 52, rotatable shaft 40, etc.) omitted for clarity. The exemplary aspect of FIG. 7 is similar to the aspect depicted in FIG. 6. However, one notable difference between the non-limiting aspect of the generator 14 schematically depicted in FIG. 6, and the generator 14 schematically depicted in FIG. 7, is that while the cavity 175 in FIG. 7 has a second material 178 disposed therein, the second material 178 is arranged as a coating 178*b*. As shown, the coating 178*b* can be disposed on the third radially outer perimetric stator sleeve surface 173. Additionally, or alternatively, in other non-limiting aspects, the coating 178*b* can be disposed on a portion of the housing interior surface 181 confronting the third radially outer perimetric stator sleeve surface 173. The proportions of the coating 178*b* have been exaggerated for clarity. Most notably, the thickness of the coating 178*b* is exaggerated for clarity. It is contemplated that thickness of the coating 178*b* can be proportionally much smaller. However, in various aspects, the coating 178*b* can have any desired thickness without departing from the scope of the disclosure. For example, in non-limiting aspects the coating 178*b* can have a thickness of 0.005 inch (i.e., 0.5 mils) or less.

In addition, to enhance the wettability or bonding ability of the coating 178*b* (i.e., to the third radially outer perimetric stator sleeve surface 173, or the portion of the housing interior surface 181 confronting the third radially outer perimetric stator sleeve surface 173, or both), the second material 178 may further optionally comprise a reactive element. For example, in a non-limiting aspect, the reactive element can comprise any of chromium (Cr), titanium (Ti), zirconium (Zr), hafnium (Hf), vanadium (V), or palladium (Pd), individually, or in various combinations thereof. In an aspect, the reactive metal can be pre-mixed or otherwise included with the second material 178. In other aspects, the reactive element can be deposited on one of the third radially outer perimetric stator sleeve surface 173, or the portion of the housing interior surface 181 confronting the third radially outer perimetric stator sleeve surface 173, or both, through any number of conventional deposition techniques such as sputter deposition or physical vapor deposition. The reactive element is operative to react and bond with the second material 178 and the stator sleeve 55 or housing 18.

Regardless of whether the second material 178 is provided in the cavity 175 as an annular structure 178*a*, or as a coating 178*b* wherein the cavity 175 and second material 178 define a thermal barrier 179 between the stator sleeve 55 and the housing 18. More specifically, the second material 178 defines a thermal barrier 179 between the third radially outer perimetric stator sleeve surface 173 and the portion of the housing interior surface 181 confronting the third radially outer perimetric stator sleeve surface 173.

With reference to FIG. 3, during power-generating operations, the rotation of the rotatable shaft 40 relative to the stationary generator 14 components ultimately induces generates current in the stator windings 90, which is further provided to a generator power outlet, which it can be supplied to power or energize a set of electrical loads. Specifically, the rotation of the rotor 52 relative to the stator 54 will generate heat due to heat losses, copper losses, resistive losses, winding losses, or the like, as the current traverses the respective resistive windings. In addition to the winding losses, the stator windings 90 can generate or retain unwanted heat due to, for example, core losses due to hysteresis or eddy currents.

With simultaneous reference back to FIG. 6, and FIG. 7, in operation, the heat generated in the stator 54 is conducted radially outward to the stator sleeve 55. The heat received by the stator sleeve 55 is then conducted radially outward to the housing 18. However, the thermal barrier 179 disposed at the axial center of the stator sleeve 55, between the stator sleeve 55 and housing 18, will cause heat to flow more readily from the first and second diametric end portions 161, 162 of the stator sleeve 55 to the housing 18 than from the intermediate wall portion 163 to the housing 18. That is, a relatively greater thermal flow from the axial ends of the stator sleeve 55 (i.e., the first and second diametric end portions 161, 162) to the housing 18, than from the axially central portion of the stator sleeve 55 (i.e., the intermediate wall portion 163) is arranged due to the thermal barrier 179. In this way, the thermal barrier 179 can operatively reduce or eliminate hot spots or relatively higher localized temperatures at the axial center of the stator sleeve 55, with more heat being transferred to the housing at the first and second diametric end portions 161, 162 where it can more readily be cooled (e.g., via convection, or fluid cooling systems).

Accordingly, aspects of the disclosure can be implemented without need of fluid cooling, or can be implemented in conjunction with fluid cooling systems, in both dry cavity and wet cavity type electric machines. For example, aspects of the disclosure enable or provide a generator 14 having increased cooling capabilities over contemporary generators. Since aspects of the disclosure significantly increase the stator 54 or set of stator windings 90 cooling capability the generator 14 can be designed or operated without, or free of, additional cooling systems external to the generator 14, other than the cooling system 80 described herein. For example, aspects of the disclosure can provide for a dry cavity generator 14 wherein the system can be designed or operated without, or free of, at least an external fluid cooling jacket such that the system provides cooling greater than or equal to a predetermined level, wherein the predetermined level is based on an external fluid cooling jacket. Alternatively, or in addition to the aforementioned benefit, the above-described aspects enable or provide a generator 14 that operate at a higher power density, or generate increased power levels, without a loss in power-generation efficiency due to undesirable heating.

In non-limiting aspects, operating the cooling system 80 to enable or provide increased cooling capabilities, and thus higher power generation operating capability, further enables or provides for a generator 14 having a higher overall power density compared with a conventional electric machine.

Yet another advantage of the above-described aspects can include increased efficiency with regards to the cooling system. For instance, wet cavity type of cooling is an effective cooling strategy for generators, but is less efficient compared with dry cavity cooling described herein. In another non-limiting example, inefficiencies in wet cavity cooling due to the oil interactions with moving components in the cavity cause significant dynamic losses for the generator. Aspects of the disclosure can provide a construction of dry cavity generators that includes high efficiency cooling and high power density.

Aspects of the generator 14 described herein can also be included in a method 300 of forming the generator 14. While the method 300 will be described herein, for ease of understanding, in terms of the generator 14 and associated elements described with respect to FIGS. 3-7, other aspects are not so limited and method 300 can be implemented with any electric machine without departing from the scope of the disclosure.

Figure 8:
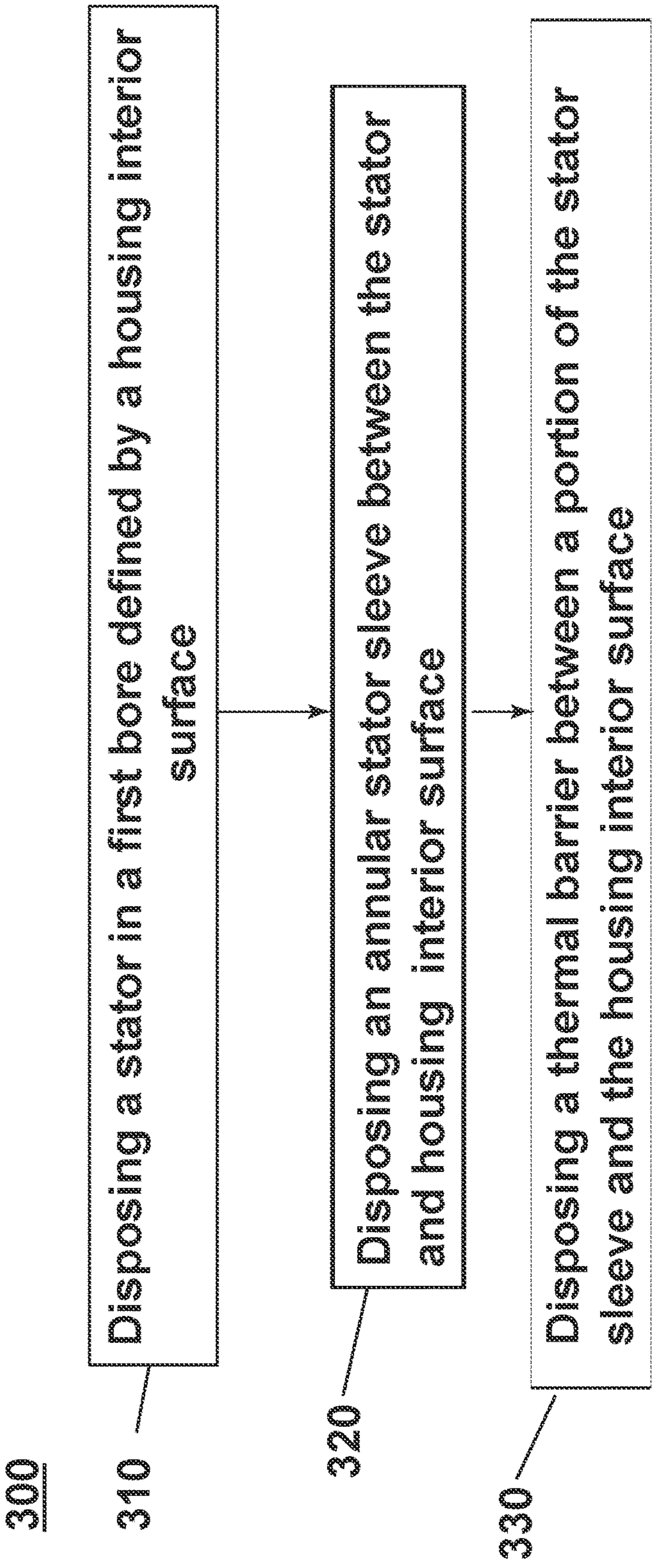
FIG. 8 is a flow diagram illustrating a method of forming an electric machine, in accordance with various aspects described herein.

FIG. 8 depicts a flow diagram of a method 300 of forming an electric machine, such as a generator 14, in accordance with various aspects as described herein. For example, the method 300 of forming the generator 14 can include at 310, arranging or disposing the stator 54 in a first bore 191 defined by the housing interior surface 181. The stator 54 can include the radially outer perimetric stator surface 152 and the radially inner perimetric stator surface 151, the radially inner perimetric stator surface 151 defining the second bore 192.

The method 300 can further include, at 320, arranging or disposing the annular stator sleeve 55 between the stator 54 and the housing interior surface 181. The stator sleeve 55 can have the radially inner perimetric stator sleeve surface 170 defining a third bore 193. The stator sleeve 55 can further include the first diametric end portion 161 having the radially outer first perimetric stator sleeve surface 171, an opposing second diametric end portion 162 axially spaced from the first diametric end portion 161 having the radially outer second perimetric stator sleeve surface 172, and the intermediate wall portion 163 extending axially therebetween having the third radially outer perimetric stator sleeve surface 173. In non-limiting aspects, the stator sleeve 55 is formed of a first material 177 having a first thermal conductivity TC1, and the thermal barrier 179 comprises a second material having a second thermal conductivity TC2, wherein the second thermal conductivity TC2 is less than the first thermal conductivity TC1.

The method 300 can further include, at 330, arranging or disposing a thermal barrier 179 between the third radially outer perimetric stator sleeve surface 173 and the housing interior surface 181. In non-limiting aspects, the disposing a thermal barrier 179 between the third radially outer perimetric stator sleeve surface 173 and the housing interior surface 181 can include forming the cavity 175 between the third radially outer perimetric stator sleeve surface 173 and the housing interior surface 181, and arranging or disposing the thermal barrier 179 in the cavity 175.

The method described is for example purposes only and is not meant to limit the method in any way as it is understood that the portions of the method can proceed in a different logical order, additional or intervening portions can be included, or described portions of the method can be divided into multiple portions, or described portions of the method can be omitted without detracting from the described method.

Although the above aspects have been described in terms of a generator for a gas turbine engine, the above-described aspects can be used in any electric machine to significantly increase the stator or rotor power-generating or cooling capability. The above-described aspects of the disclosure can be well-suited for certain generator applications, such as a two-pole generator (e.g., two stator poles and two rotor poles) positioned proximate to the turbine engine, and thus creating a high temperature and space or volume-limited environment for generator operation.

The aspects described above provider for a variety of benefits including that they have higher efficiency, high reliability, less maintenance, all-attitude operation, and lower weight. By attaining increased cooling capabilities for the dry cavity electric machine free of cooling systems external to the machine other than those described herein, the electric machine can eliminate the additional the costs, complexity, weight, and size requirements of the additional cooling systems otherwise needed. The resulting electric machine is lighter, smaller, and has less complexity than conventional dry cavity machines. The resulting electric machine also has a higher power density due to at least one of a reduced axial length of the rotatable shaft, increased power generation due to improved cooling capabilities, or a combination thereof. Such a weight reduction, improved cooling capabilities, or a higher power density is important in a turbine engine environment and provides a competitive advantage during flight. The reduced complexity can also correspond to reduced maintenance over time, also providing lower operating costs.

To the extent not already described, the different features and structures of the various aspects can be used in combination with others as desired. That one feature cannot be illustrated in some of the aspects is not meant to be construed that it cannot be, but is done for brevity of description.

Thus, the various features of the different aspects can be mixed and matched as desired to form new aspects, whether or not the new aspects are expressly described.

This written description uses examples in the present disclosure, including the best mode, and also to enable any person skilled in the art to practice the claimed subject matter, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

An electric machine comprising: a housing having a housing interior surface defining a first bore; a stator disposed in the first bore, the stator having a radially outer perimetric stator surface and a radially inner perimetric stator surface, the radially inner perimetric stator surface defining a second bore; an annular stator sleeve disposed between the stator and the housing interior surface, the stator sleeve having a radially inner perimetric stator sleeve surface defining a third bore, the stator sleeve including a first diametric end portion having a radially outer first perimetric stator sleeve surface, an opposing second diametric end portion axially spaced from the first diametric end portion having a radially outer second perimetric stator sleeve surface, and an intermediate wall portion extending axially between the first and second diametric end portions, and having a radially outer third perimetric stator sleeve surface; and a thermal barrier disposed between the radially outer third perimetric stator sleeve surface and the housing interior surface.

The electric machine of any preceding clause, further comprising a rotor disposed within the second bore, the rotor including a rotatable shaft being rotatable relative to the stator and defining rotational axis.

The electric machine of any preceding clause, wherein the radially outer first perimetric stator sleeve surface and the radially outer second perimetric stator sleeve surface are coupled to the housing interior surface.

The electric machine of any preceding clause, wherein the radially outer first perimetric stator sleeve surface and the radially outer second perimetric stator sleeve surface are coupled to the housing interior surface via an interference fit.

The electric machine of any preceding clause, wherein the radially inner perimetric stator sleeve surface is coupled to the radially outer perimetric stator surface.

The electric machine of any preceding clause, wherein the radially inner perimetric stator sleeve surface is coupled to the radially outer perimetric stator surface via an interference fit.

The electric machine of any preceding clause, wherein the radially outer first, second, and third perimetric stator sleeve surfaces respectively define a first, a second, and a third diameter.

The electric machine of any preceding clause, wherein the third diameter is less than the first and second diameters.

The electric machine of any preceding clause, wherein the radially outer third perimetric stator sleeve surface and the housing interior surface cooperatively define a cavity therebetween.

The electric machine of any preceding clause, wherein the thermal barrier is disposed in the cavity.

The electric machine of any preceding clause, wherein the cavity circumscribes the stator sleeve.

The electric machine of any preceding clause, wherein the cavity extends axially between the first and second diametric end portions of the stator sleeve.

The electric machine of any preceding clause, wherein the stator sleeve is formed of a first material, and the thermal barrier comprises a second material.

The electric machine of any preceding clause, wherein the first material has a first thermal conductivity, and the second material has a second thermal conductivity, and wherein the second thermal conductivity is less than the first thermal conductivity.

The electric machine of any preceding clause, wherein the second material partially fills the cavity.

The electric machine of any preceding clause, wherein the second material defines a coating disposed on the radially outer third perimetric stator sleeve surface.

The electric machine of any preceding clause, wherein the second material is air.

A method of forming an electric machine, comprising: disposing a stator in a first bore defined by a housing interior surface, the stator having a radially outer perimetric stator surface and a radially inner perimetric stator surface, the radially inner perimetric stator surface defining a second bore; disposing an annular stator sleeve between the stator and the housing interior surface, the stator sleeve having a radially inner perimetric stator sleeve surface defining a third bore, the stator sleeve including a first diametric end portion having a radially outer first perimetric stator sleeve surface, an opposing second diametric end portion axially spaced from the first diametric end portion having a radially outer second perimetric stator sleeve surface, and an intermediate wall portion extending axially therebetween having a radially outer third perimetric stator sleeve surface; and disposing a thermal barrier between the radially outer third perimetric stator sleeve surface and the housing interior surface.

The method of any preceding clause, wherein disposing the thermal barrier between the radially outer third perimetric stator sleeve surface and the housing interior surface includes: forming a cavity between the radially outer third perimetric stator sleeve surface and the housing interior surface; and disposing the thermal barrier in the cavity.

The method of any preceding clause, wherein the stator sleeve is formed of a first material having a first thermal conductivity, and the thermal barrier comprises a second material having a second thermal conductivity, and wherein the second thermal conductivity is less than the first thermal conductivity.

What is claimed is:

1. An electric machine comprising:

a housing having a housing interior surface defining a first bore;

a stator disposed in the first bore, the stator having a radially outer perimetric stator surface and a radially inner perimetric stator surface, the radially inner perimetric stator surface defining a second bore;

an annular stator sleeve disposed between the stator and the housing interior surface, the stator sleeve having a radially inner perimetric stator sleeve surface defining a third bore, the stator sleeve including a first diametric end portion having a radially outer first perimetric stator sleeve surface, an opposing second diametric end portion axially spaced from the first diametric end portion having a radially outer second perimetric stator sleeve surface, and an intermediate wall portion extending axially between the first and second diametric end portions, and having a radially outer third perimetric stator sleeve surface; and a thermal barrier disposed between the radially outer third perimetric stator sleeve surface and the housing interior surface, wherein the thermal barrier has an axial length that is less than an axial length of the stator.

2. The electric machine of claim 1, further comprising a rotor disposed within the second bore, the rotor including a rotatable shaft being rotatable relative to the stator and defining rotational axis.

3. The electric machine of claim 1, wherein the radially outer first, second, and third perimetric stator sleeve surfaces respectively define a first, a second, and a third diameter.

4. The electric machine of claim 3, wherein the third diameter is less than the first and second diameters.

5. The electric machine of claim 1, wherein the radially outer third perimetric stator sleeve surface and the housing interior surface cooperatively define a cavity therebetween.

6. The electric machine of claim 5, wherein the thermal barrier is disposed in the cavity.

7. The electric machine of claim 6, wherein the stator sleeve is formed of a first material, and the thermal barrier comprises a second material.

8. The electric machine of claim 7, wherein the first material has a first thermal conductivity, and the second material has a second thermal conductivity, and wherein the second thermal conductivity is less than the first thermal conductivity.

9. The electric machine of claim 7, wherein the second material partially fills the cavity.

10. The electric machine of claim 7, wherein the second material defines a coating disposed on the radially outer third perimetric stator sleeve surface.

11. The electric machine of claim 7, wherein the second material is air.

12. The electric machine of claim 5, wherein the cavity circumscribes the stator sleeve.

13. The electric machine of claim 9, wherein the cavity extends axially between the first and second diametric end portions of the stator sleeve.

14. The electric machine of claim 13, wherein the thermal barrier is disposed at an axial center of the stator sleeve.

15. The electric machine of claim 13, wherein the intermediate wall portion extends between 30% and 90% of an axial length of the stator sleeve.

16. The electric machine of claim 15, wherein the intermediate wall portion extends between 50% and 75% of the axial length of the stator sleeve.

17. The electric machine of claim 1, wherein the thermal barrier is disposed at an axial center of the stator such that at least a portion of the stator extends axially beyond respective diametric end portions of the thermal barrier.

18. A method of forming an electric machine, comprising:

disposing a stator in a first bore defined by a housing interior surface, the stator having a radially outer perimetric stator surface and a radially inner perimetric stator surface, the radially inner perimetric stator surface defining a second bore;

disposing an annular stator sleeve between the stator and the housing interior surface, the stator sleeve having a radially inner perimetric stator sleeve surface defining a third bore, the stator sleeve including a first diametric end portion having a radially outer first perimetric stator sleeve surface, an opposing second diametric end portion axially spaced from the first diametric end portion having a radially outer second perimetric stator sleeve surface, and an intermediate wall portion extending axially therebetween having a radially outer third perimetric stator sleeve surface; and disposing a thermal barrier between the radially outer third perimetric stator sleeve surface and the housing interior surface, wherein the thermal barrier has an axial length that is less than an axial length of the stator.

19. The method of claim 18, wherein disposing the thermal barrier between the radially outer third perimetric stator sleeve surface and the housing interior surface includes:

forming a cavity between the radially outer third perimetric stator sleeve surface and the housing interior surface; and disposing the thermal barrier in the cavity.

20. The method of claim 19, wherein the stator sleeve is formed of a first material having a first thermal conductivity, and the thermal barrier comprises a second material having a second thermal conductivity, and wherein the second thermal conductivity is less than the first thermal conductivity.

* * * * *